(12) United States Patent
Lai et al.

(10) Patent No.: US 10,277,098 B2
(45) Date of Patent: Apr. 30, 2019

(54) END CAP ASSEMBLY FOR SUPPRESSING ELECTROMAGNETIC INTERFERENCE AND MOTOR HAVING THE SAME

(71) Applicant: JOHNSON ELECTRIC INTERNATIONAL AG, Murten (CH)

(72) Inventors: Chi Wai Lai, Hong Kong (CN); Qing Bin Luo, Shenzhen (CN); Gong Wu Xu, Shenzhen (CN); Xin Peng Wei, Shenzhen (CN); Xiao Lin Ren, Shenzhen (CN); Gui Hong Tian, Shenzhen (CN); Hong Wei Zhang, Shenzhen (CN); Xia Han, Shenzhen (CN)

(73) Assignee: Johnson Electric International AG, Murten (CH)

( * ) Notice: Subject to any disclaimer, the term of this patent is extended or adjusted under 35 U.S.C. 154(b) by 719 days.

(21) Appl. No.: 14/820,010

(22) Filed: Aug. 6, 2015

(65) Prior Publication Data
US 2016/0043618 A1    Feb. 11, 2016

(30) Foreign Application Priority Data

Aug. 6, 2014    (CN) .......................... 2014 1 0385348

(51) Int. Cl.
*H02K 5/14*     (2006.01)
*H02K 23/66*    (2006.01)
*H02K 11/026*   (2016.01)

(52) U.S. Cl.
CPC .......... *H02K 11/026* (2013.01); *H02K 5/148* (2013.01); *H02K 23/66* (2013.01)

(58) Field of Classification Search
CPC ........ H02K 5/14–5/148; H02K 11/026; H02K 23/66

USPC ......................................... 310/233, 235, 239
See application file for complete search history.

(56) References Cited

U.S. PATENT DOCUMENTS

| 5,196,750 | A  | * | 3/1993  | Strobl ..................... | H02K 5/145 310/239 |
| 2004/0017126 | A1 | * | 1/2004  | Laurandel ............. | H01R 39/39 310/242 |
| 2009/0121578 | A1 | * | 5/2009  | Benkert ................. | H02K 5/148 310/239 |
| 2009/0255186 | A1 | * | 10/2009 | Uchimura .............. | H02K 5/148 310/239 |

FOREIGN PATENT DOCUMENTS

| CN | 201387803 Y |   | 1/2010 |             |
| DE | 10342697 A1 | * | 4/2005 | ............. H02K 5/148 |

OTHER PUBLICATIONS

Machine translation of DE-10342697-A1.*

* cited by examiner

*Primary Examiner* — John K Kim
*Assistant Examiner* — Minki Chang
(74) *Attorney, Agent, or Firm* — Muncy, Geissler, Olds & Lowe, P.C.

(57) ABSTRACT

An end cap assembly for an electric motor has a brush assembly, a circuit board, an inductor and a grounded metal element. The brush assembly has a plurality of brushes. The circuit board is fixed relative to the brush assembly. The inductor is electrically connected to the circuit board. The grounded metal element is positioned between the brushes and the inductor to absorb high frequency electromagnetic radiation transmitted from the brushes to the inductor.

10 Claims, 7 Drawing Sheets

END CAP ASSEMBLY FOR SUPPRESSING ELECTROMAGNETIC INTERFERENCE AND MOTOR HAVING THE SAME

CROSS REFERENCE TO RELATED APPLICATIONS

This non-provisional patent application claims priority under 35 U.S.C. § 119(a) from Patent Application No. 201410385348.7 filed in The People's Republic of China on Aug. 6, 2014, the entire contents of which are hereby incorporated by reference.

FIELD OF THE INVENTION

This invention relates to electric motors and in particular, to an electric motor with an end cap assembly for suppressing electromagnetic interference (EMI).

BACKGROUND OF THE INVENTION

To decrease EMI by a brush motor with electronic elements arranged around the brush motor, a filter circuit is disposed between the brush and the external power source. The filter circuit includes inductors and/or capacitors. When the motor is in operation, current commutation and sparks are generated by the commutator segments of the commutator rotating relative to the brush, which results in electromagnetic radiation which may cause electromagnetic interference with neighboring electronic equipment. Metal elements such as the inductors and metal portions of the brush installation may act as antennas to transmit or radiate the EMI signals. If the electromagnetic radiation has a high frequency, the metal elements mat transmit the electromagnetic radiation of the motor beyond an acceptable radiation limit.

SUMMARY OF THE INVENTION

Hence there is a desire for a motor and an end cap assembly which can suppress the electromagnetic interference signals.

Accordingly, in one aspect thereof, the present invention provides an end cap assembly comprising: a brush assembly having a plurality of brushes; a circuit board fixed relative to the brush assembly; an inductor electrically connected to the circuit board; and a grounded metal element positioned between the brushes and the inductor to absorb high frequency electromagnetic interference signals transmitted from the brushes.

Preferably, the metal element is made of copper.

Preferably, the metal element is elongated and has a U-shaped cross section.

Preferably, the metal element defines a receiving space in which the inductor is received.

Preferably, the metal element comprises a base plate and two side plates extending from two long sides of the base plate, respectively, the base plate and the side plates cooperatively defining the receiving space.

Preferably, the brush assembly comprises an insulating bracket to which the metal element is fixed.

Preferably, one side plate of the metal element bends outwardly to form a fixing tab, a fixing hole is formed in the fixing tab and a fixing post is formed on the insulating bracket and engages the fixing hole to fix the metal element to the insulating bracket.

Preferably, a flange is formed on another side plate of the metal element, and a flange is formed at a center of the insulating bracket, the flange of the another side plate lapping on the flange of the insulating bracket.

Preferably, an end cap receives the brush assembly and the circuit board, a plurality of latch blocks being formed on an outer circumference of the brush assembly, and a plurality of latches being defined in a circumferential wall of the end cap and arranged to respectively engage with the latch blocks.

According to a second aspect, the present invention provides an end cap assembly comprising: at least one brush cage made of a metal material; a brush received in the brush cage; and a grounded metal element electrically connected to the brush cage to absorb high frequency electromagnetic radiation coupled to the brush cage.

Preferably, there are two brush cages, and the metal element comprises a main body and two side portions extending from two sides of the main body, the side portions electrically contacting the two brush cages.

Preferably, each of the side portions is planar and of an L-shape.

Preferably, the metal element further comprises a grounding portion having an L-shaped cross section.

According to another aspect, the present invention provides a motor which includes a stator, a rotor, and an end cap assembly as described above. The stator has a housing and a magnet disposed on a wall of the housing. The rotor has a shaft, a rotor core and a commutator fixed on the shaft. The metal element of the end cap assembly electrically contacts the housing.

Preferably, the housing has an open end at which the end cap assembly is disposed, a portion of an edge of the open end of the housing corresponding to the metal element is bent inwards to form a crimp, the crimp electrically contacting the metal element to the housing.

In the present invention, high frequency electromagnetic interference signals coupled to the metal elements positioned around the motor can be absorbed by the metal element, and ultimately absorbed by the housing of the motor, and thereby can be effectively suppressed.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
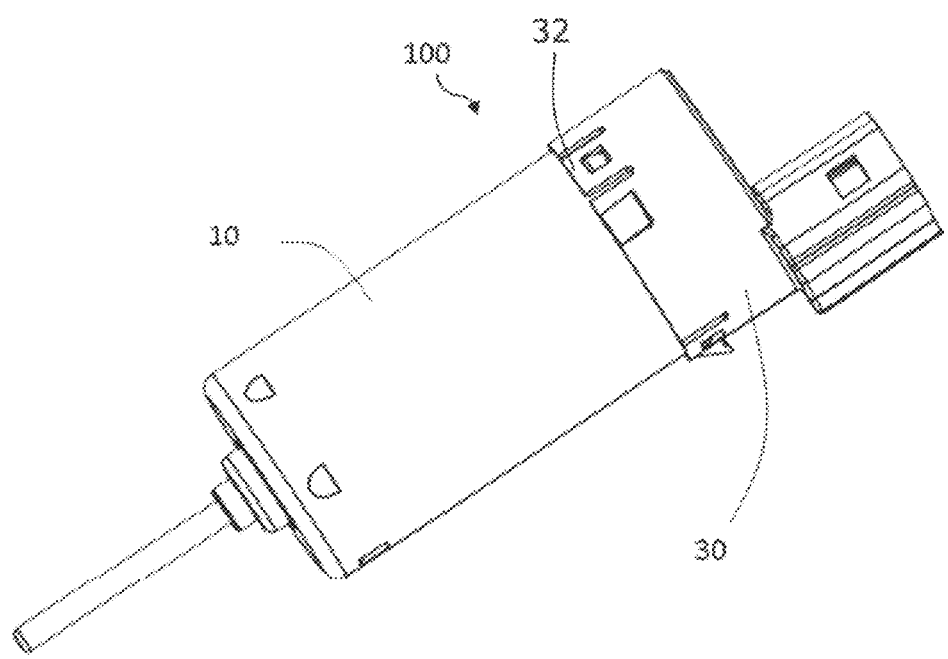
FIG. 1 is an isometric view of a motor provided by a first embodiment of the present invention.
Figure 2:
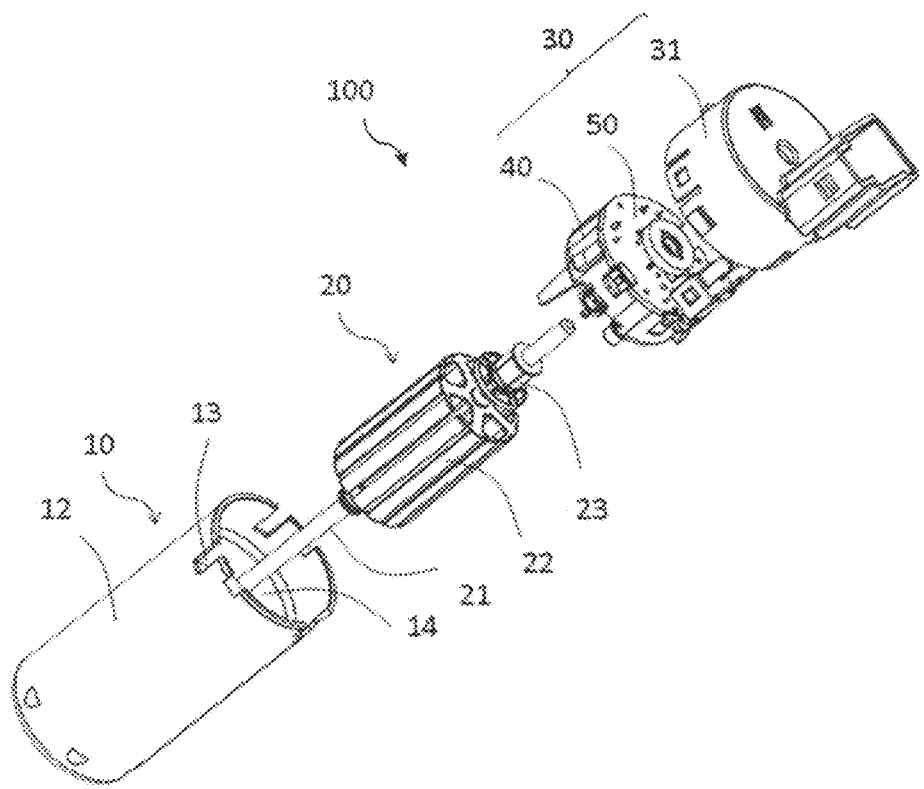
FIG. 2 is an exploded view of the motor shown in FIG. 1.

Referring to FIGS. 1 and 2, a motor 100 provided by a first embodiment of present invention comprises a stator 10, a rotor 20 and an end cap assembly 30. The stator 10 comprises a housing 12 and a magnet 14 attached to an inner wall of the housing 12. The housing 12 has an open end. A plurality of positioning slots 13 is defined in a circumferential periphery of the open end of the housing 12.

The rotor 20 comprises a shaft 21, a rotor core 22 and a commutator 23 both fixed to the shaft 21, and a rotor winding comprising a number of coils (not shown) wound on the core 22 and electrically connected to segments of the commutator 23.

The end cap assembly 30 comprises an end cap 31, and a brush assembly 40 and a circuit board 50 both received in the end cap 31. The circuit board 50 is fixed at one side of the brush assembly 40. Latches 32 are defined in the circumferential wall of the end cap 31.

Figure 3:
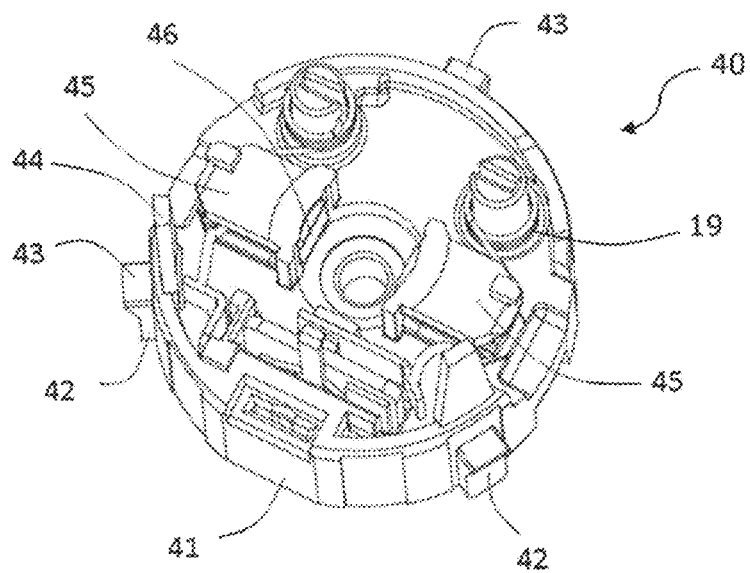
FIG. 3 shows a brush assembly, being a part of the motor of FIG. 1.
Figure 4:
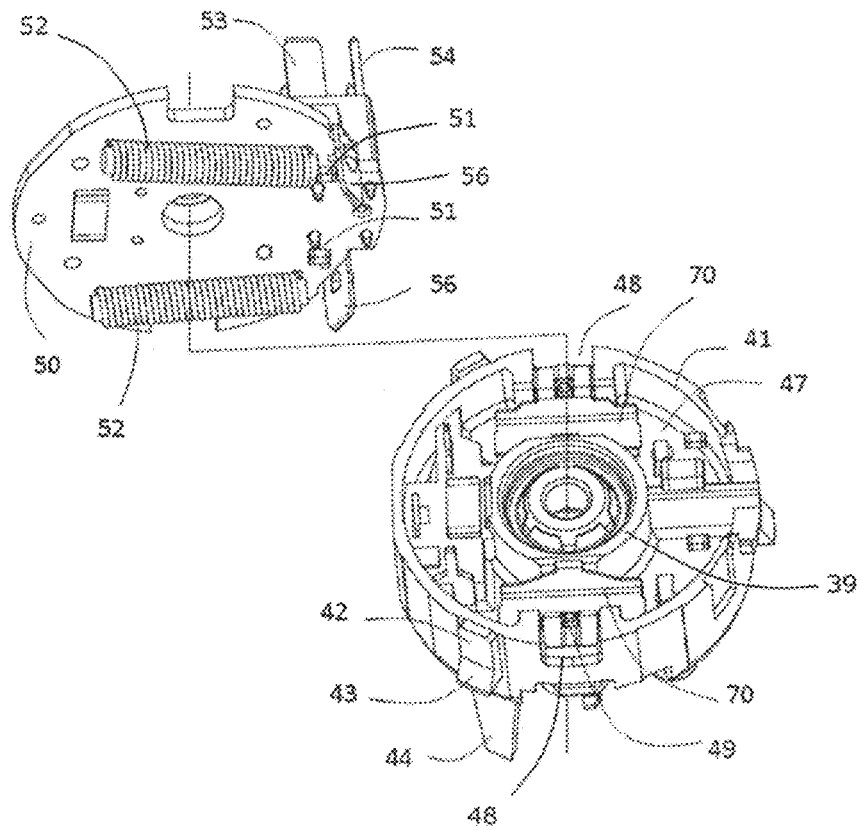
FIG. 4 is a partially exploded view of the brush assembly and a circuit board of the motor of FIG. 1.
Figure 5:
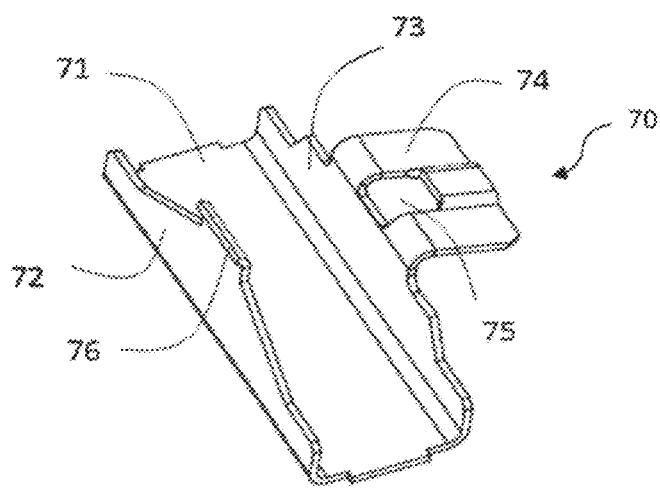
FIG. 5 shows a metal element of the brush assembly shown in FIG. 4.

Referring to FIGS. 3, 4 and 5, the brush assembly 40 comprises an insulating bracket 41. The insulating bracket 41 is preferably formed from plastic by injection molding. The outer diameter of the insulating bracket 41 is substantially equal to the inner diameter of the housing 12, such that the insulating bracket 41 can be inserted into the open end of the housing 12. Positioning portions 42 extend radially outwardly from an outer circumference of the insulating bracket 41. The positioning portions 42 correspond to the positioning slots 13 and are received in the positioning slots 13 to fix the brush assembly 40 relative to the housing 12 in the circumferential direction. They also limit the depth to which the insulating body can be inserted into the housing. A latch block 43 is formed on an axial end of each positioning portion 42 for engaging a corresponding latch 32 of the end cap 31 to thereby fix the end cap 31 to the brush assembly 40. At least one magnet contact portion 44 extends axially from the insulating bracket 41 into the housing 12 to make contact with the magnet 14. In this way the end cap assembly prevents axial movement of the magnet which, at the end remote from the end cap, sits on steps formed in the side of the housing.

Two brush mounting portions in the form of brush cages 45 are formed on an inner face, i.e., the face adjacent the housing, of the insulating bracket 41. A brush 46 is slidably received in each brush cage 45. The brushes 46 are in sliding contact with the commutator 23 of the rotor 20 under the influence of springs 19. An outer face of the insulating bracket 41, i.e., the face remote from the housing, connects with the circuit board 50.

A plurality of electronic elements is disposed on the circuit board 50. Specifically, filter elements such as capacitors 51 and inductors 52, are disposed on the inner surface, i.e., the surface facing the insulating bracket 41, of the circuit board 50. Power supply terminals 53 for connecting to an external power source and signal terminals 54 for transferring signals are provided on the outer surface of the circuit board 50. The power supply terminals 53 and the signal terminals 54 extend through holes in the circuit board 50 and are connected to the inner surface of the circuit board 50 by soldering. The capacitors 51 are grounding capacitors and positioned close to the power supply terminals 53. Two grounding elements 56 are provided on the outer surface of the circuit board 50. One end of each grounding element 56 connects to the outer surface of the circuit board 50, and the opposite end bends from the margin of the circuit board 50 to extend along the periphery of the insulating bracket 41. After the end cap assembly 30 and the stator 10 are assembled, the opposite end of each grounding element 56 rests on and electrically connects to the inner surface of the housing 12. The capacitors 51 connect to the grounding elements 56 via the holes and the printed circuits of the circuit board 50 to achieve a grounding connection.

A receiving space 47 is defined on the outer face of the insulating bracket 41 for receiving the electronic elements on the inner surface of the circuit board 50. Two metal elements 70 are arranged in the receiving space 47 corresponding to the two inductors 52. The metal elements 70 can be made of any metal materials and preferably are made of copper. The metal elements 70 are positioned at the back of the brushes 46, to absorb part of the electromagnetic radiation generated by the brushes 46, and prevent the electromagnetic radiation from interfering with the metal elements such as the inductors 52 positioned on the outer face of the insulating bracket 41. The brushes are the main source of the electromagnetic radiation in the motor. The metal elements 70 provided in the present invention can absorb the electromagnetic radiation from source, thus effectively suppressing the electromagnetic interference.

In the present embodiment, each metal element 70 has a generally elongated shape with a generally U-shaped cross section. Each metal element 70 comprises a base plate 71 and two side plates 72, 73 extending from two long sides of the base plate 71 respectively. An angle is formed between the base plate 71 and the side plates 72, 73. In the present embodiment, the side plates 72, 73 are substantially vertical to the base plate 71. In an alternative embodiment, the angle between the side plates 72, 73 and the base plate 71 can be larger than or smaller than 90 degrees. A fixing tab 74 is formed by bending outwardly the side plate 73 and is positioned at a radially outer side of the insulating bracket 41. A fixing hole 75 is defined in the fixing tab 74. A fixing groove 48 is defined in the insulating bracket 41 to accommodate the fixing tab 74. A fixing post 49 protrudes from the bottom of the fixing groove 48 and locates in the fixing hole 75 to fix the metal element 70 to the insulating bracket 41. The side plate 72 of the metal element 70 bends outwards slightly to form a flange 76. The flange 76 laps on an annular flange 39 at a center of the insulating bracket 41, such that the metal element 70 can be firmly fixed on the insulating bracket 41.

Figure 6:
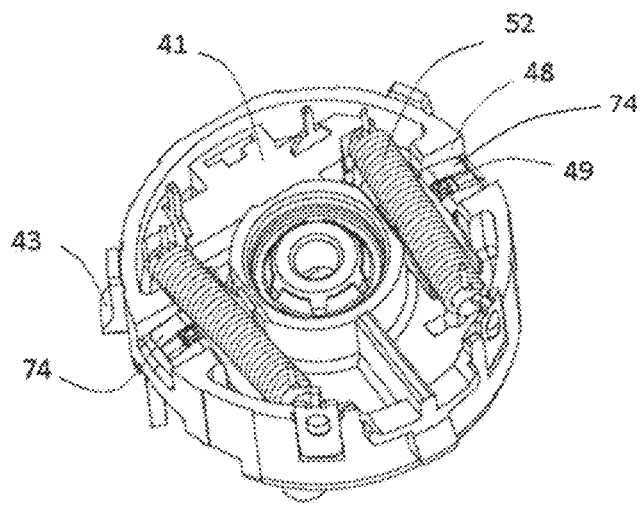
FIG. 6 shows the brush assembly of FIG. 4, with the metal elements removed.

As shown in FIG. 6, after the circuit board 50 is assembled onto the insulating bracket 41, a large portion of the inductor 52 is received in a space defined between the side plates 72, 73 and the base plate 71 of the metal element 70.

Figure 7:
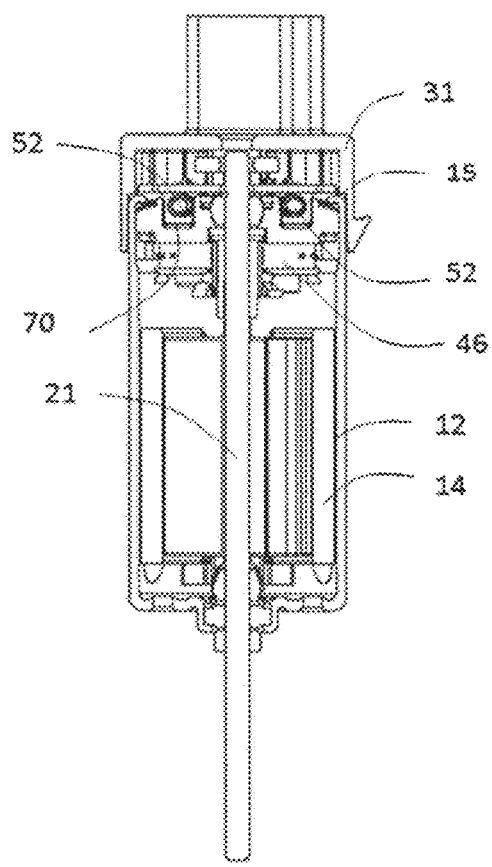
FIG. 7 is a sectional view of the motor of FIG. 1.

Referring to FIG. 7, after the end cap assembly 30 is installed on the housing 12, the portion of the edge of the open end of the housing 12 corresponding to the fixing tab 74 is bent inwards to form a crimp 15. The crimp 15 electrically contacts the fixing tab 74 to achieve a grounding connection of the metal element 70.

In the present embodiment, the inductors 52, which are the main electronic elements at the outer face of the insulating bracket 41, are mostly received in the metal elements 70, and the metal elements 70 substantially obstruct the route from the brushes 46 to the inductors 52, thus the high-frequency electromagnetic radiation generated by the brushes 46 can be absorbed by the metal elements 70, and then conducted from the metal elements 70 to the housing 12 so as to be absorbed by the housing 12. As a result, the high-frequency electromagnetic radiation generated by the brushes 46 is prevented from being coupled to the inductors 72, thereby suppressing the high frequency electromagnetic interference.

Figure 8:
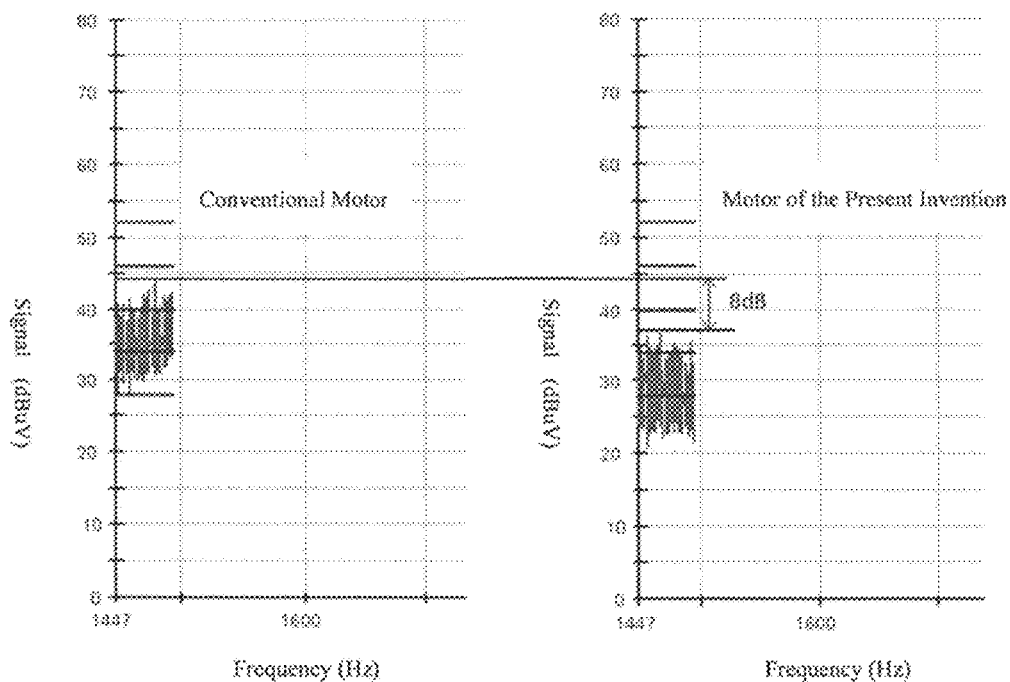
FIG. 8 shows a comparison of EMI test results of the motor of FIG. 1 and a conventional motor.

FIG. 8 shows a comparison of EMI test results of the motor provided by the present embodiment and a conventional motor. The test results at the high-frequency band of 1.447G-1.494G are chosen for illustration. In this high-frequency band, the electromagnetic interference signal of the motor provided in the present embodiment decreases by about 8 dB.

Figure 9:
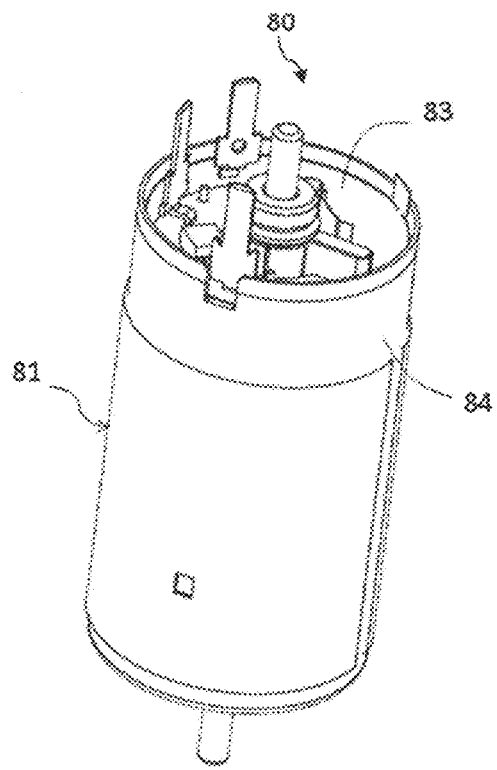
FIG. 9 illustrates a motor according to a second embodiment of the present invention, shown with a cover removed.

FIG. 9 shows a motor 80 provided by a second embodiment of the present invention. The motor 80 comprises a stator 81, a rotor 82 (see FIG. 12) and an end cap assembly 83. The housing 84 of the stator 81 has an open end into which the end cap assembly 83 is inserted. A cover or end cap, forming a part of the end cap assembly has been omitted to show the inner parts of the end cap assembly more clearly.

Figure 10:
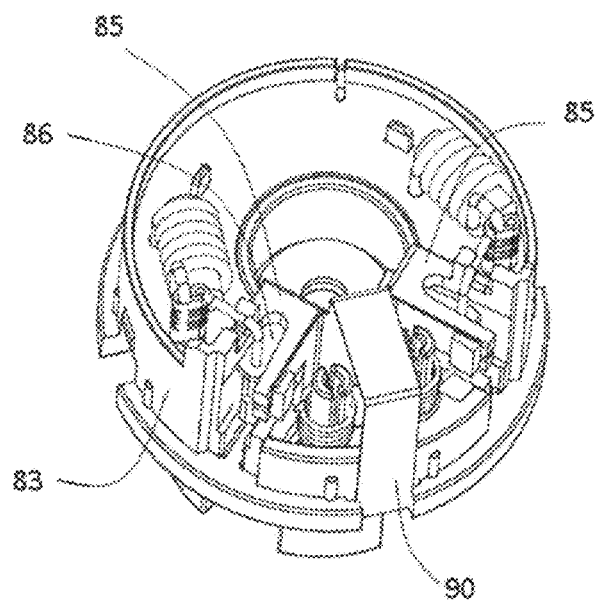
FIG. 10 shows an end cap assembly of the motor of FIG. 9.
Figure 11:
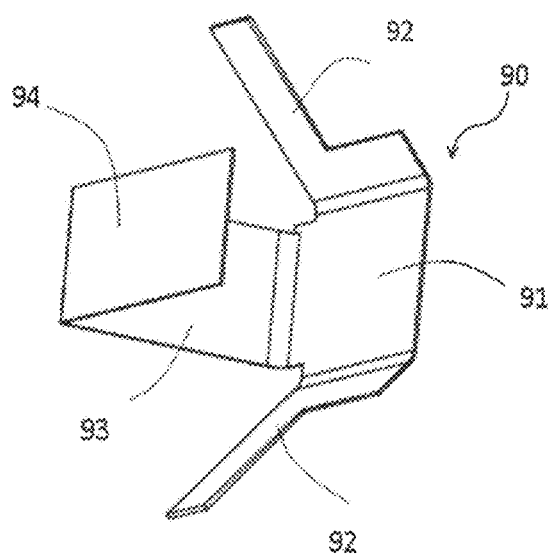
FIG. 11 shows a metal element of the end cap assembly of FIG. 10.
Figure 12:
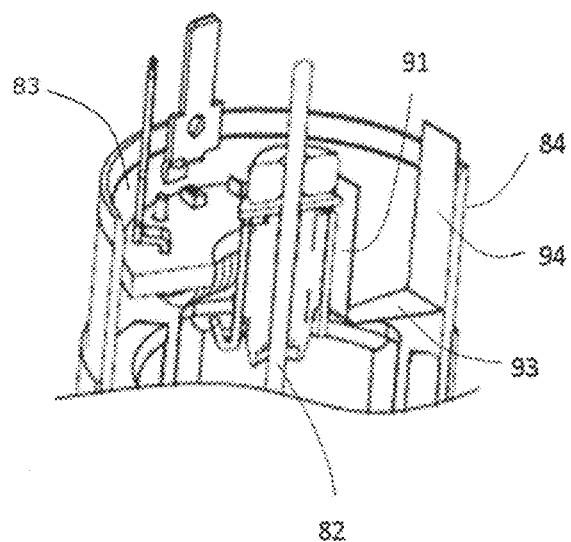
FIG. 12 is a sectional view of a part of the motor of FIG. 9, with part of the end cap assembly being omitted to show the relationship between the housing and the metal element.

Also referring to FIGS. 10, 11 and 12, the inner face of the end cap assembly 83 has two brush cages 85 each for receiving a brush 86 therein. The brushes 86 are in sliding contact with the commutator of the rotor 82. In the present embodiment, the brush cages 85 are made of a metal material. Therefore, once the high frequency electromagnetic radiation generated by the brushes 86 rotating relative to the commutator of the rotor 82 are coupled to the brush cages 85, the brush cares 85 become transmitting antennas that transmit the high frequency interference signals outwards. To avoid this situation, the end cap assembly 83 further comprises a metal element 90.

The metal element 90 comprises a main body 91, two side portions 92 extending from two sides of the main body 91, and a grounding portion 93 extending from an end of the main body 91. The side plates 92 have an L shape. Each side portion 92 has a side connected to the main body 91 and expand outwards from the main body 91 to electrically contact a corresponding one of the brush cages 85. The angle between the side portion 92 and the main body 91 is greater than 90 degrees. Alternatively, the angle between the side portion 92 and the main body 91 can be 90 degrees.

The grounding portion 93 is configured as a plate having an L-shaped cross section. The grounding portion 93 includes one end connecting to the main body 91, and an opposite end extending vertically to form a free end 94. The free end 94 faces and is parallel to the main body 91. The free end 94 is configured to electrically contact the inner surface of the wall of the housing 84.

Since the metal element 90 is in electrical contact with both of the brush cages 85 and the housing 84 of the stator 81, the brush cages 85 are grounded. As such, even if the high frequency electromagnetic radiation generated by the brushes 86 are coupled to the brush cages 85, the high frequency electromagnetic radiation can be absorbed by the brush cages 85 and then transmitted to the housing 84 to be absorbed by the housing 84, thereby suppressing the EMI emitted by the motor 80.

Figure 13:
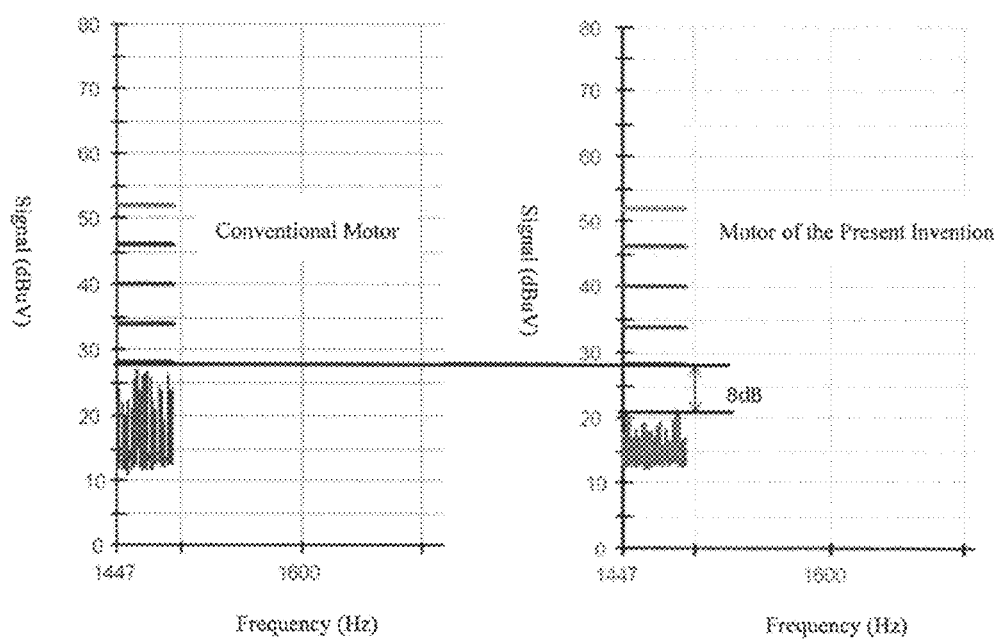
FIG. 13 shows a comparison of EMI test results of the motor of FIG. 9 and a conventional motor.

FIG. 13 shows a comparison of the EMI test results of the motor 80 provided by the present embodiment and a conventional motor. In the high-frequency band of 1.447G-1.494G, the electromagnetic interference signal of the motor provided by the present embodiment decreases by about 8 dB.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. An end cap assembly comprising:
   a brush assembly having a plurality of brushes;
   a circuit board fixed relative to the brush assembly;
   an inductor electrically connected to the circuit board; and
   a grounded metal element positioned between the brushes and the inductor, the metal element being configured to substantially obstruct a route from the brushes to the inductor to absorb high frequency electromagnetic interference signals transmitted from the brushes;
   wherein the inductor is mostly covered by the metal element, the metal element comprises a base plate and two side plates extending from two long sides of the base plate, respectively, the base plate and the side plates cooperatively defining a receiving space to receive the inductor such that the inductor is mostly covered by the metal element, the brush assembly comprises an insulating bracket to which the metal element is fixed;
   wherein one side plate of the metal element bends outwardly to form a fixing tab, a fixing hole is formed in the fixing tab and a fixing post is formed on the insulating bracket and engages the fixing hole to fix the metal element to the insulating bracket.

2. The end cap assembly of claim 1, wherein the metal element is made of copper.

3. The end cap assembly of claim 1, wherein the metal element is elongated and has a U-shaped cross section.

4. The end cap assembly of claim 1, wherein a flange is formed on another side plate of the metal element, and a flange is formed at a center of the insulating bracket, the flange of the another side plate lapping on the flange of the insulating bracket.

5. The end cap assembly of claim 1 further comprising an end cap receiving the brush assembly and the circuit board, a plurality of latch blocks being formed on an outer circumference of the brush assembly, and a plurality of latches being defined in a circumferential wall of the end cap and arranged to respectively engage with the latch blocks.

6. A motor comprising:
   a stator having a housing and a magnet disposed on a wall of the housing;
   a rotor having a shaft, a rotor core and a commutator fixed on the shaft; and the end cap assembly of claim 1, the metal element of the end cap assembly electrically contacting the housing.

7. The motor of claim 6, wherein the housing has an open end at which the end cap assembly is disposed, a portion of an edge of the open end of the housing corresponding to the metal element is bent inwards to form a crimp, the crimp electrically contacting the metal element to the housing.

8. The motor of claim 6, wherein the metal element is elongated and has a U-shaped cross section defining the receiving space in which the inductor is received such that the inductor is mostly covered by the metal element.

9. The motor of claim 6, wherein a flange is formed on the other side plate of the metal element, and a flange is formed at a center of the insulating bracket, the flange of the other side plate lapping on the flange of the insulating bracket.

10. The motor of claim 6, further comprising an end cap receiving the brush assembly and the circuit board, a plurality of latch blocks being formed on an outer circumference of the brush assembly, and a plurality of latches being defined in a circumferential wall of the end cap and arranged to respectively engage with the latch blocks.

\* \* \* \* \*